United States Patent Office 3,490,485
Patented Jan. 20, 1970

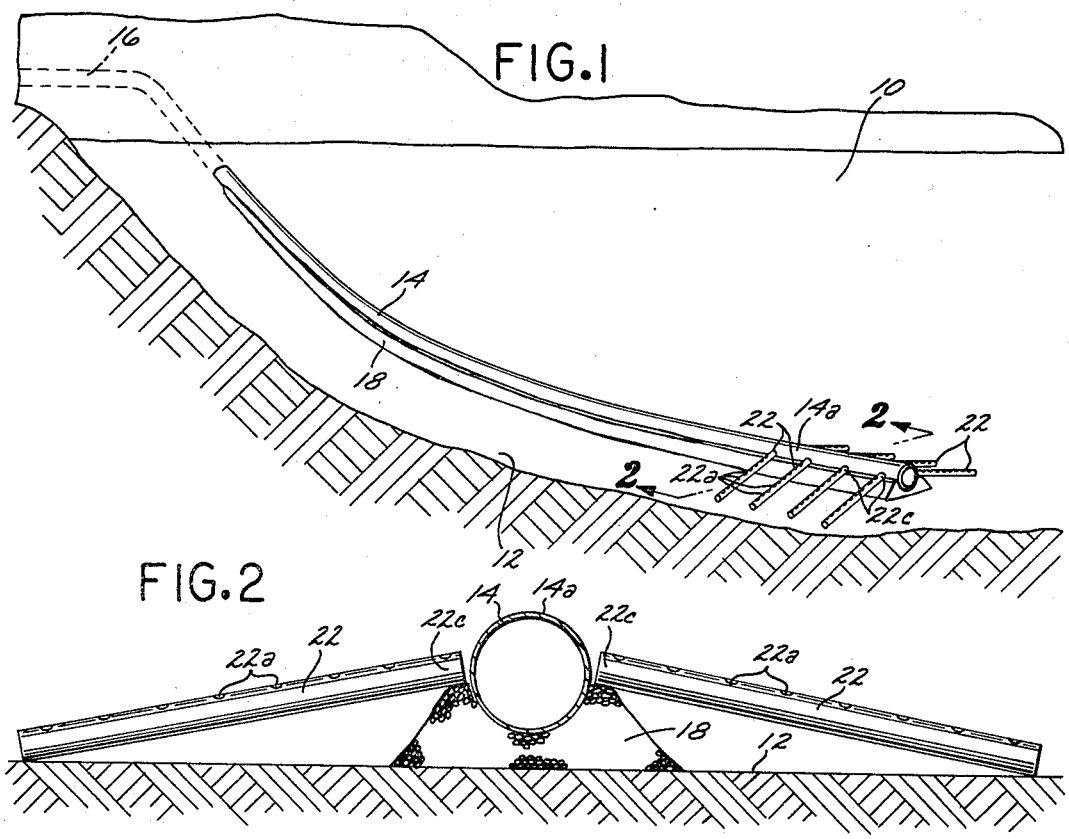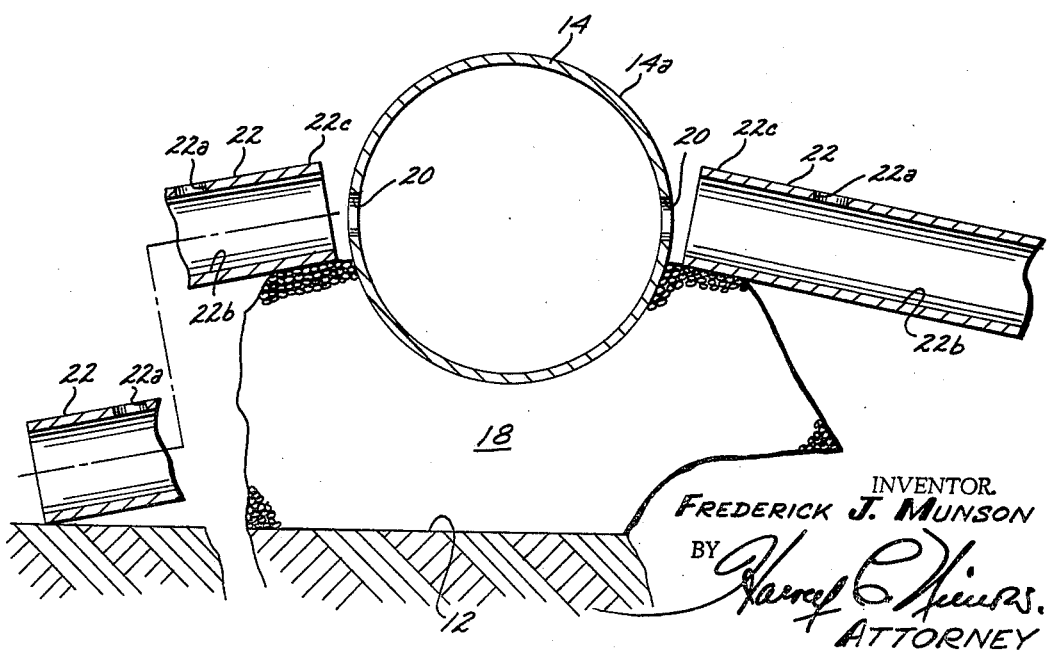

3,490,485
EFFLUENT DISPOSING SYSTEM
Frederick J. Munson, 19332 S. Mesa Drive,
Villa Park, Calif. 92667
Filed Aug. 11, 1967, Ser. No. 659,963
Int. Cl. E03f *1/00, 3/04;* F16l *9/00*
U.S. Cl. 137—236    4 Claims

ABSTRACT OF THE DISCLOSURE

This invention pertains to systems for disposing of sewage into large bodies of water such as the oceans. It comprises a long outfall which extends from a sewage processing plant into the ocean. The extended end portion of the outfall is formed with orifices for discharging the effluent into diffusers aligned with such orifices.

The diffusers are spaced a predetermined distance from the orifices to entrain sea water with the effluent as it is forced under pressure into the diffusers. The diffusers are formed with diffuser openings for letting the sewage and intermixed sea water seep into the ocean for dissipation therein with normal ocean currents.

---

The present invention relates generally to effluent disposing systems and, more particularly, to systems for disposing of effluent within the oceans or other large bodies of water.

The disposal of waste products has become of major concern to authorities responsible for these matters. Disposable articles and packaging have become so prevalent in the present way of life, that it is a major undertaking to rid the cities and other metropolitan areas of the vast accumulation of waste.

Disposal of sewage has also become of increasing concern not only due to the ever increasing population but also due to the lack of depositories for such materials. Relatively large numbers of sewage processing plants have been constructed, and they are being constantly improved in order to properly chemically treat sewage to condition it for return to the soil or water as the case may be.

For a considerable period of time, one method of disposing of sewage, after it was chemically treated, has been to pump it out into the ocean or other large body of water. In order to do this, large concrete pipes referred to as "outfalls" have been laid on the ocean bottom or floor from the processing plant to a location of considerable depth within the ocean. The effluent or processed sewage is then pumped through such outfall to such location within the ocean.

It is intended that such effluent be dissipated within the large body of ocean water by the motion of the various ocean currents and wave action. However, prior disposing systems of this nature have not been particularly efficient in causing such dissipation of effluent. Rather the effluent has tended to remain in relatively large thick clouds which float within the ocean, and which frequently reach the surface to remain there in an unsightly and undesirable manner.

It has long been the desire of engineers and other professionals associated with problems of sewage disposal, to have a system which will insure complete intermixing and hence dissipation entirely of the effluent within the ocean to thereby eliminate such unsightly conditions.

It is an object of the present invention to provide an effluent disposing system which completely and effectively emits effluent into the ocean such as to prevent the formation of clouds thereof within the ocean.

Another object of the present invention is to provide a system as characterized above which utilizes ocean water for intermixing with the effluent and for absorbing the relatively high pressures of the effluent as it is pumped into the ocean.

A further object of the present invention is to provide a system as characterized above which is capable of extending any reasonable distance into the ocean, and of being installed therein at virtually any desired depth.

Another further object of the present invention is to provide a system as characterized above which effects entrainment of sea water with the effluent before the latter is finally discharged or emits into the ocean.

A still further object of the present invention is to provide a system as characterized above comprising an outfall having predetermined discharge orifices and diffusers which are spaced from such orifices for entraining the sea water with the pressurized effluent as the latter is forced from the outfall into the diffusers.

An even further object of the present invention is to provide an effluent disposing as characterized above which is relatively simple in operation and maintenance, and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a perspective view of an effluent disposing system according to the present invention;

FIGURE 2 is a transverse sectional view of such system, taken substantially along line 2—2 of FIGURE 1; and FIGURE 3 is an enlarged fragmentary view of that shown in FIGURE 2.

Like reference characters indicate corresponding parts throughout the several views of the drawings.

Referring to FIGURE 1 of the drawings, there is shown therein a relatively large body of water 10 such as an ocean or lake wherein the effluent is to be dispersed. Such body of water includes a floor or bottom 12 along which the system is laid as will hereinafter become more apparent.

A main outfall 14 is laid along the bottom 12 of the ocean 10, extending from a sewage processing plant (not shown) to a relatively remote and deep location within the ocean. The processing plant, of course, is located along the shoreline of the ocean 10 and suitable conduits as shown at 16 conduct the effluent from such processing plant to the outfall 14.

Suitable supporting structure 18 is provided for the outfall 14, the latter of which is formed of relatively large diameter concrete pipe formed in sections of predetermined length. Such concrete outfall, for some large metropolitan areas, may be eight or ten feet in diameter, depending upon the quantity of effluent to be carried and the pressure to be encountered. That is, the wall thickness of such outfall is determined by the ocean depth at which the outfall is laid, as well as by the fluid pressure required for pumping the effluent into the ocean at such depth and against such static pressure.

Such support means 18 may take substantially any desired form but typically comprises a bed of rocks and sand held together to prevent movement thereof with normal ocean currents. The usual structure of this type is vulnerable only to relatively large abrupt forces such as occasioned by the dragging thereacross of large heavy anchors used by ocean going vessels. In any event, the support structure 18 should be determined in accordance with the particular ocean problems to be encountered and does not comprise a part of the instant invention.

The extended end portion 14a of outfall 14 is formed with a multiplicity of discharge orifices as shown at 20 in FIGURE 3. Such orifices are arranged in two rows on opposite sides of the outfall 14, and range in diameter from two inches to eight inches depending upon the quantity of effluent to be discharged into the ocean as well as the nozzle effect or pressure to be obtained. The wall thickness of outfall 14, wherein the discharge orifices 20 are formed, is usually on the order of eight inches thick. Such orifices are cut through the side wall to provide generally cylindrically shaped orifices having an axis which is substantially at right angles to the length or main axis of the outfall itself. Such discharge orifices should be sufficiently large to prevent accumulation of effluent or other foreign material which might decrease the effective size and thus prevent proper flow of effluent therethrough.

Positioned adjacent the extended end portion 14a of outfall 14, and on either side thereof, is a series of diffusers 22 one for each of the aforementioned discharge orifices 20 of the outfall 14. Each diffuser 22 is formed with a plurality of diffuser openings 22a for allowing effluent and entrained sea water to gently seep into the body of ocean water as will hereinafter be explained in greater detail.

The diffusers 22 may be formed of any appropriate material such as concrete, specially treated steel and the like. Each diffuser 22 is formed with a through opening 22b having approximately twice the cross-sectional area as that of the discharge orifice associated therewith.

The purpose of the diffusers is to permit the effluent to slowly seep into the ocean body so as to be thoroughly intermixed and diffused with the ocean water as a result of the normal movements of water due to ocean currents and the like. That is, to overcome the formation of large clouds or bodies of effluent which hang within the ocean or remain at the surface thereof, it is desirable to remove all of the energy from the effluent so as to permit the energy of the ocean currents to control the effluent. However, since the effluent must be pumped at relatively high pressure in order to reach the considerable depths for discharge thereof, the effluent tends to retain such energy and therefore to remain in a cloud or ball within the ocean.

The diffuser tubes have as one of their purposes, the removal of energy, in the form of pressure, from the effluent so as to render such effluent more susceptible to the ocean movements. To accomplish this, it is preferable to place the end portions 22c of each diffuser tube 22 a predetermined distance from the corresponding or associated discharge orifice 20. This provides a relatively large supply of sea water at the end 22c of each diffuser tube 22, between such tube and the corresponding orifice. Such sea water is available for entrainment with the effluent so as to be thoroughly intermixed therewith within the diffusers, and to absorb much of the kinetic energy occasioned by the high fluid pressure.

The relative size of the orifices 20 and the openings 22b of the associated diffuser tubes 22 is extremely important in that the diffuser tubes must be sufficiently large to accommodate all of the effluent from the associated discharge orifice, as well as to effectively decrease the discharge pressure of the effluent. It has been found most desirable to have the cross-sectional area of the openings 22b be at least twice the cross-sectional area of the associated discharge orifices 20. This means that the relatively high nozzle pressure which results from the effluent being forced through the discharge orifices 20 is permitted to dissipate within the diffuser tubes prior to such effluent seeping through the diffuser openings 22a. In addition thereto, the high nozzle pressure effectively entrains a relatively large quantity of sea water with the effluent as it enters the diffuser tubes to effect thorough intermixing therewith to effectively dilute the effluent.

The effluent then seeps through the diffuser openings 22a into the open sea so as to be moved about in random fashion by the ocean currents thus causing the same to be completely and thoroughly intermixed with the sea water and to thus be dispersed.

It has been found that by selecting the proper diameter for openings 22b of the diffuser tubes 22 and by placing such diffuser tubes a predetermined distance from the associated orifices 20, even though the centrally located opening 22b of each diffuser tube extends the entire length thereof, substantially little discharge of effluent from the downstream end of the diffuser results. This indicates that the fluid pressure of the effluent is virtually entirely dissipated and that the effluent is intermixed with the entrained sea water.

As indicated in FIGURE 2 of the drawings, each diffuser 22 is substantially aligned with its respective discharge orifice. To accomplish this, one end of such tube may rest against the support means 18 for the main outfall 14 while the other end rests upon the ocean floor or bottom.

It is thus seen that the present invention provides an effluent disposing system which effectively causes dissipation of the effluent within the body of sea water rather than permitting the same to remain in clouds within the ocean or on the surface thereof.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. In a sewage disposing system, the combination of, an elongated main outfall at least partially submerged within a body of water and adapted to carry a stream of sewage under pressure, said outfall being formed with a discharge orifice having an axis transverse of the length of said outfall, and a diffuser having an elongated opening having greater cross-sectional area that said orifice and a plurality of diffuser openings substantially at right angles thereto opening directly to said body of water, said diffuser being aligned with and generally axial of said discharge orifice whereby the sewage is permitted to seep through said diffuser openings into said body of water; wherein at least a portion of said outfall is totally submerged in said body of water and said diffuser is positioned sloping downwardly and is spaced a distance from said outfall discharge orifice sufficient to permit entrainment of water from said body of water to assist is dissipating the pressure of said sewage.

2. A sewage disposing system according to claim 1, wherein said diffuser is formed with a central through opening having one end aligned with but spaced from said discharge orifice.

3. A sewage disposing system according to claim 2, wherein said through opening in said diffuser is formed with a cross-sectional area at least twice the cross-sectional area of said discharge orifice aligned therewith.

4. In a sewage disposing system, the combination of, an elongated main outfall at least partially submerged within a body of water and adapted to carry a stream of sewage under pressure, said outfall being formed with a discharge orifice having an axis transverse of the length of said outfall, and a diffuser having an elongated opening having greater cross-sectional area than said orifice and a plurality of diffuser openings substantially at right angles thereto opening directly to said body of water, said diffuser being aligned with and generally axial of said discharge orifice whereby the sewage is permitted to seep through said diffuser openings into said body of water; wherein said main outfall has its discharge openings arranged in two rows one on each side thereof, and said diffusers are individually and separately positioned sloping downwardly in alignment with the respective discharge orifice whereby a relatively large quantity of sewage can be disposed of within a given period of time; wherein the elongated opening of each diffuser is formed with a cross-sectional area at least twice the cross-sectional area of the corresponding discharge orifice; and wherein each of said diffusers is spaced from said main outfall a predetermined distance in alignment with the respective discharge orifice, said predetermined distance being such as to cause intermixing of said sewage with water from said body of water as said sewage is forced under pressure from said outfall into said diffusers.

References Cited

UNITED STATES PATENTS

| | | | |
|---|---|---|---|
| 843,926 | 2/1907 | Brasher | 61—6 |
| 1,371,144 | 3/1921 | Brooks | 137—604 |
| 1,643,273 | 9/1927 | Imhoff | 210—170 |
| 2,382,393 | 8/1945 | Bille | 61—6 |
| 2,536,196 | 1/1951 | MacLeod | 61—13 |
| 2,692,644 | 10/1954 | Murray | 137—604 XR |
| 2,795,542 | 6/1957 | Horne | 61—11 XR |
| 3,375,666 | 4/1968 | Sutton | 61—13 |

FOREIGN PATENTS 593,064   5/1959   Italy.

HAROLD W. WEAKLEY, Primary Examiner

U.S. Cl. X.R.

137—604